(12) United States Patent
Imai et al.

(10) Patent No.: US 6,285,982 B1
(45) Date of Patent: Sep. 4, 2001

(54) SOUND DECOMPRESSING APPARATUS PROVIDING IMPROVED SOUND QUALITY DURING SPECIAL REPRODUCING SUCH AS FORWARD SEARCH REPRODUCING AND REVERSE SEARCH REPRODUCING

(75) Inventors: Tutomu Imai, Yokohama; Junji Shiokawa, Chigasaki; Tomohiro Esaki, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/136,263

(22) Filed: Aug. 12, 1998

(30) Foreign Application Priority Data

Aug. 22, 1997 (JP) .............................. P09-226002

(51) Int. Cl.[7] .................................. G10L 21/04
(52) U.S. Cl. .............................. 704/503; 386/68; 386/75; 704/200.1
(58) Field of Search ................ 704/503, 200.1; 386/6, 39, 68, 75; 348/239

(56) References Cited

U.S. PATENT DOCUMENTS

| 5,510,899 | 4/1996 | Kim . | |
| 5,594,660 | * 1/1997 | Sung et al. | 364/514 R |
| 5,596,420 | 1/1997 | Daum . | |
| 5,598,352 | * 1/1997 | Rosenau et al. | 364/514 A |
| 5,706,396 | 1/1998 | Schröder et al. . | |
| 5,815,634 | * 9/1998 | Daum et al. | 386/96 |
| 6,005,600 | * 12/1999 | Hill | 348/7 |
| 6,026,067 | * 2/2000 | Tanaka | 369/48 |

FOREIGN PATENT DOCUMENTS

| 4202140 | 7/1993 | (DE) . | |
| 0469804 | 2/1992 | (EP) . | |
| 0632922 | 11/1996 | (EP) . | |
| 6077839 | 3/1994 | (JP) | H03M/7/30 |
| 8116314 | 5/1996 | (JP) | H04B/14/04 |
| 8251032 | 9/1996 | (JP) | H03M/7/30 |
| 11-257433 | * 9/1998 | (JP) | G11B/20/10 |
| 10-203784 | * 7/1999 | (JP) | G11B/20/10 |
| 93/11536 | 6/1993 | (WO) . | |

OTHER PUBLICATIONS

ISO/IEC 11172–3: 1993 (E).

* cited by examiner

Primary Examiner—Tālivaldis Ivars Šmits
(74) Attorney, Agent, or Firm—Antonelli, Terry, Stout & Kraus, LLP (57) ABSTRACT

A sound decompressing apparatus which achieves special reproducing, also known as trick play, two examples of which are forward search reproducing and reverse search reproducing, by selecting and decompressing frames containing sound data at fixed or predetermined intervals. The apparatus may adjust the output level of reproduced sounds during special reproducing.

18 Claims, 5 Drawing Sheets

| INDEX | SCALEFACTOR | INDEX | SCALEFACTOR |
|---|---|---|---|
| 0 | 2.00000000000000 | 32 | 0.00123039165029 |
| 1 | 1.58740105196820 | 33 | 0.00097656250000 |
| 2 | 1.25992104989487 | 34 | 0.00077509816991 |
| 3 | 1.00000000000000 | 35 | 0.00061519582514 |
| 4 | 0.79370052598410 | 36 | 0.00048828125000 |
| 5 | 0.62996052494744 | 37 | 0.00038754908495 |
| 6 | 0.50000000000000 | 38 | 0.00030759791257 |
| 7 | 0.39685026299205 | 39 | 0.00024414062500 |
| 8 | 0.31498026247372 | 40 | 0.00019377454248 |
| 9 | 0.25000000000000 | 41 | 0.00015379895629 |
| 10 | 0.19842513149602 | 42 | 0.00012207031250 |
| 11 | 0.15749013123686 | 43 | 0.00009688727124 |
| 12 | 0.12500000000000 | 44 | 0.00007689947814 |
| 13 | 0.09921256574801 | 45 | 0.00006103515625 |
| 14 | 0.07874506561843 | 46 | 0.00004844363562 |
| 15 | 0.06250000000000 | 47 | 0.00003844973907 |
| 16 | 0.04960628287401 | 48 | 0.00003051757813 |
| 17 | 0.03937253280921 | 49 | 0.00002422181781 |
| 18 | 0.03125000000000 | 50 | 0.00001922486954 |
| 19 | 0.02480314143700 | 51 | 0.00001525878906 |
| 20 | 0.01968626640461 | 52 | 0.00001211090890 |
| 21 | 0.01562500000000 | 53 | 0.00000961243477 |
| 22 | 0.01240157071850 | 54 | 0.00000762939453 |
| 23 | 0.00984313320230 | 55 | 0.00000605545445 |
| 24 | 0.00781250000000 | 56 | 0.00000480621738 |
| 25 | 0.00620078535925 | 57 | 0.00000381469727 |
| 26 | 0.00492156660115 | 58 | 0.00000302772723 |
| 27 | 0.00390625000000 | 59 | 0.00000240310869 |
| 28 | 0.00310039267963 | 60 | 0.00000190734863 |
| 29 | 0.00246078330058 | 61 | 0.00000151386361 |
| 30 | 0.00195312500000 | 62 | 0.00000120155435 |
| 31 | 0.00155019633981 | | |

FIG. 10 ns, also known as trick play, two examples of which are
SOUND DECOMPRESSING APPARATUS PROVIDING IMPROVED SOUND QUALITY DURING SPECIAL REPRODUCING SUCH AS FORWARD SEARCH REPRODUCING AND REVERSE SEARCH REPRODUCING

BACKGROUND OF INVENTION

This invention relates to a decompressing apparatus for use in a video camera, an electronic still camera, a telephone having a voice recorder or voice mail, and the like.

Figure 8:
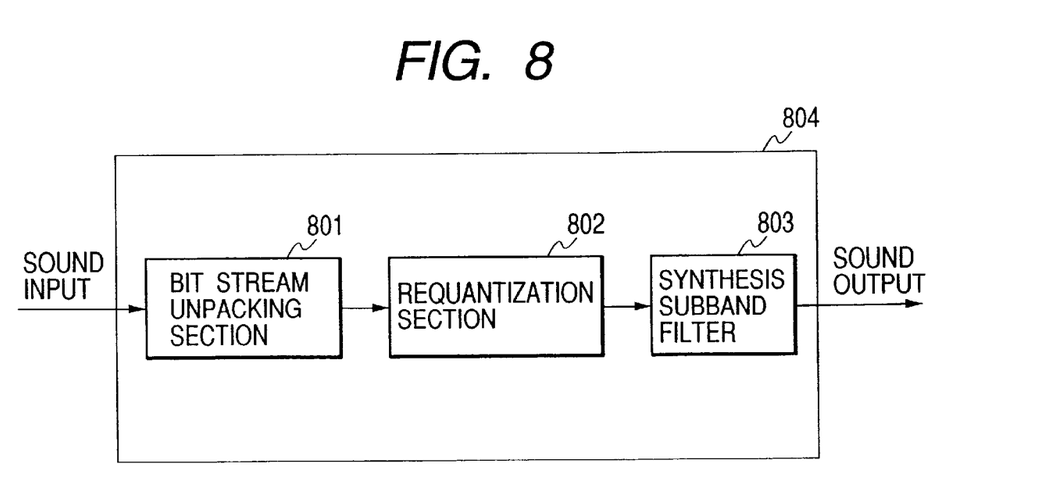
FIG. 8 is a block diagram showing a conventional sound decompressing apparatus.

A sound decompressing apparatus is disclosed in ISO/IEC 11172-3:1993 (E) (MPEG1 Audio), for example, a block diagram of which is shown in FIG. 8. Referring to FIG. 8, a sound input signal is applied to a bit stream unpacking section 801, which unpacks a bit stream into a header, a bit allocation of each band, a scale factor of each band, and sample data. A requantization section 802 requantizes the sample data based on the scale factor and the bit allocation. A synthesis subband filter 803 synthesizes the bands of the requantized sample data. However, this sound decompressing apparatus is not described in the above-mentioned publication in terms of a method for special reproducing of sounds, also known as trick play, two examples of which are forward search reproducing and reverse search reproducing. The same is also true for the control of gain during special reproducing of sounds.

SUMMARY OF THE INVENTION

It is an object of the present invention to provide a sound decompressing apparatus which is capable of executing special reproducing of sounds (trick play).

It is a further object of this invention to provide a sound decompressing apparatus which is capable of adjusting the output level of a sound signal while the apparatus executes special reproducing of sounds.

To achieve the foregoing objects of the present invention, special reproducing of sounds is carried out by processing frames at fixed or predetermined intervals. Furthermore, the output level of a sound signal is adjusted by performing gain control in a series of sound decompressing processes during special reproducing of sounds.

In accordance with the present invention, a data decompressing apparatus includes: an input determination section which detects an indication of special reproducing of sounds; a frame skip section which directs frames of a bit stream to be inputted at fixed or predetermined intervals, the bit stream consisting of frames each containing data of a fixed number of samples; a bit stream unpacking section, which inputs the frames at fixed or predetermined intervals from the bit stream inputted by the input determination section and unpacks each of the frames into a header, a bit allocation of each band, a scale factor of each band and quantized sample data divided into a plurality of frequency components of equal interval; a gain control section which calculates a new scale factor based on the scale factor of each band unformatted by the bit stream unpacking section; a requantization section which requantizes the sample data quantized in the bit stream unpacking section from the bit allocation and the new scale factor; and a synthesis subband filter which synthesizes the bands of the sample data requantized in the requantization section.

BRIEF DESCRIPTION OF THE DRAWINGS

These and other features, objects and advantages of the present invention will become more apparent from the following description, when taken in conjunction with the accompanying drawings, wherein.

DETAILED DESCRIPTION OF THE PREFERRED EMBODIMENTS

Hereinafter, an embodiment of the present invention will be described with reference to the accompanying drawings.

Figure 1:
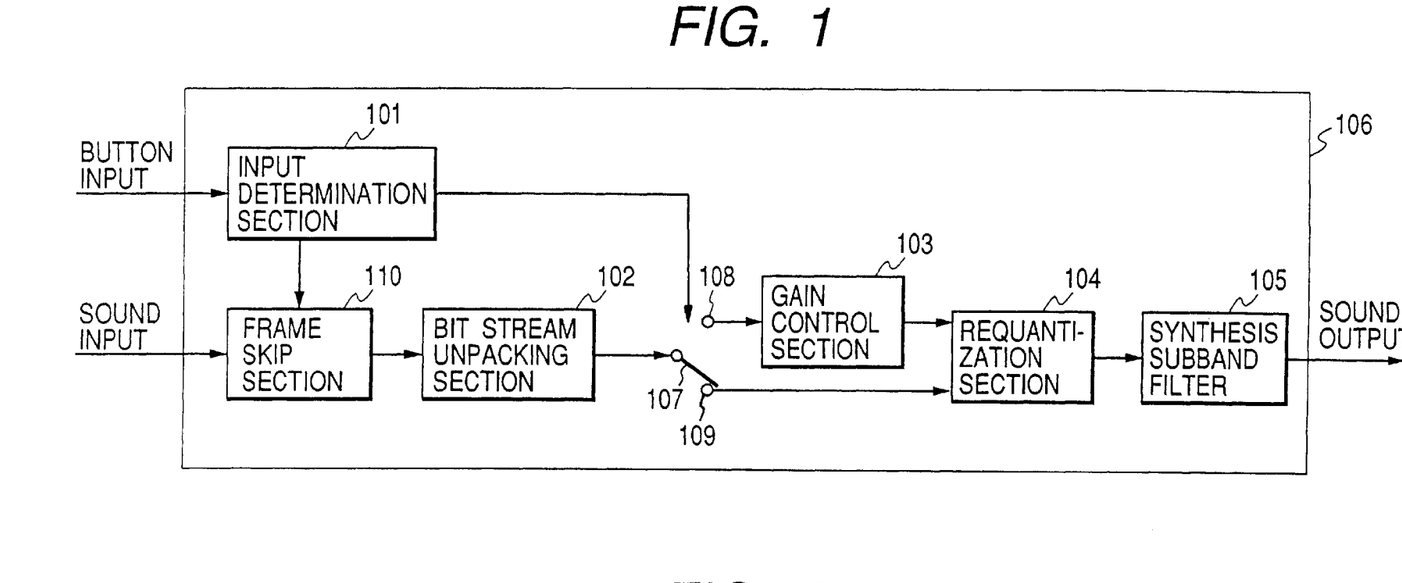
FIG. 1 is a block diagram showing an embodiment of a data decompressing apparatus according to the present invention.

FIG. 1 is a block diagram of an embodiment of the present invention. Referring to FIG. 1, a sound decompressing apparatus 106 includes an input determination section 101, a bit stream unpacking section 102, a gain control section 103, a requantization section 104, a synthesis subband filter 105, a switch 107 having contacts 108, 109, and a frame skip section 110. The input determination section 101 activates the gain control section 103 and the frame skip section 110 when a special reproducing button for indicating forward search reproducing or reverse search reproducing is pressed. The bit stream unpacking section (frame unpacking section) 102 unpacks the bit stream of the inputted sound data into a header, a bit allocation of each band, a scale factor (reproducing magnification) of each band, and quantized sample data divided into a plurality of frequency components of equal interval. The gain control section 103 calculates a new scale factor based on the scale factor of each band. The requantization section 104 requantizes the sample data. The synthesis subband filter 105 synthesizes the bands of requantized sample data. The switch 107 selects whether to activate the gain control section 103 before processing in the requantization section 104. The frame skip section 110 inputs specified data in response to a sound data input indication from the input determination section 101.

To reproduce sound data, the sound decompressing apparatus 106 performs decompressing in the smallest unit (frame), called an AAU (Audio Access Unit) of a Moving Picture Experts Group (MPEG) audio bit stream, that can be decoded to audio signals. As audio data, a fixed number of samples, e.g., 384 samples (layer I), 1152 samples (layer II), are contained in one frame.

First, a normal reproducing (forward reproducing) operation will be described using FIGS. 1 and 2.

Figure 2:
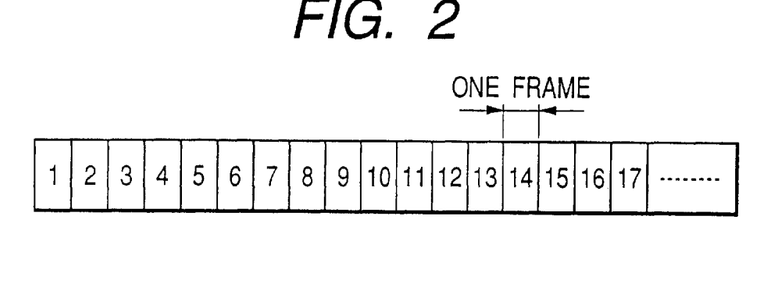
FIG. 2 is a diagram for explaining forward reproducing in a data decompressing apparatus of the present invention.

In the case of normal reproducing, frames are inputted to the bit stream unpacking section 102 in the order of the numbers shown in FIG. 2. In the bit stream unpacking section 102, the inputted bit stream is unformatted into a bit allocation of each band, a scale factor (reproducing magnification) of each band, and quantized sample data divided into a plurality of frequency components of equal interval. During forward reproducing, the switch 107 is set to the contact 109 by the input determination section 101 so as not to activate the gain control section 103. Next, the requantization section 104 performs requantization using the header, bit allocation, scale factor, and sample data unformatted in the bit stream unpacking section 102, and the bands of the requantized sample data are synthesized in the synthesis subband filter 105, thereby achieving sound decompressing.

Next, forward search reproducing (fast forward search reproducing or fast play), which is a special reproducing, will be described using FIGS. 1, 3, and 4. As one example, quadruple-speed search reproducing will be described.

If a quadruple-speed search reproducing indication is detected in the input determination section 101, the frame skip section 110 selects frames at fixed or predetermined intervals, and the frames are processed at the selected fixed or predetermined intervals in the bit stream unpacking section 102. Examples of frames subjected to input processing are shown in FIGS. 3 and 4. Only frames indicated with shading are inputted to the bit stream unpacking section 102 in the order of the indicated numbers and are processed.

Figure 3:
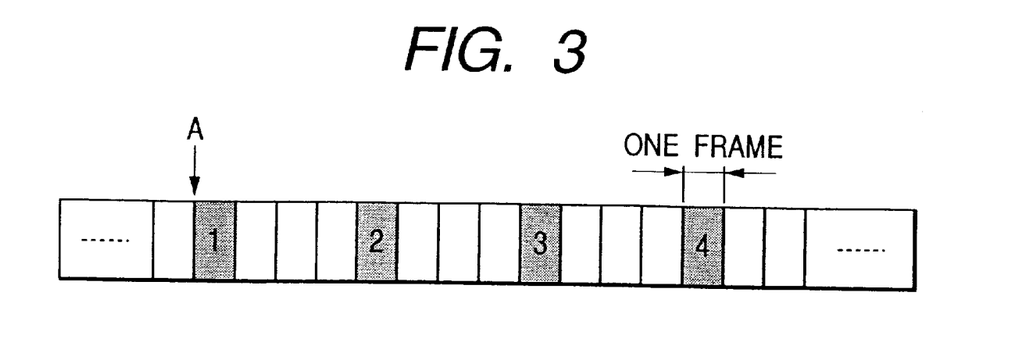
FIG. 3 is a diagram for explaining an example of quadruple-speed forward search reproducing in a data decompressing apparatus of the present invention.
Figure 4:
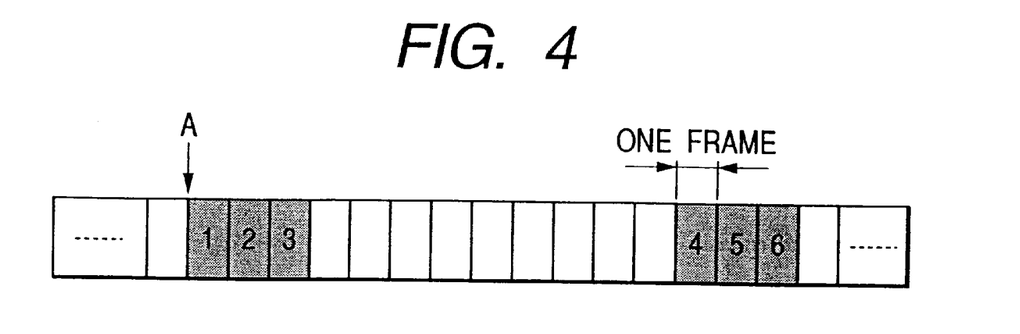
FIG. 4 is a diagram for explaining another example of quadruple-speed forward reproducing in a data decompressing apparatus of the present invention.

In FIG. 3, after one frame is processed, the next three contiguous frames are skipped to process a following frame, whereby quadruple-speed reproducing is achieved. One frame is about 36 msec (layer II, 32 kHz) according to the MPEG1 Audio Standard. In FIG. 4, after three contiguous frames are processed, the next nine contiguous frames are skipped to process the following three frames, whereby another form of quadruple-speed reproducing is achieved. Since the reproducing of three contiguous frames allows sounds to be replayed for 108 msec (=36 msec×3) at a time, more comfortable sounds may be obtained than in the scheme of FIG. 3, and a forward search operation may be made easier. By changing the interval of the frames to be selected, the speed of the search operation can be changed. For example, by selecting one frame and skipping the next five contiguous frames, a sixfold speed can be achieved.

With the forward search reproducing or reverse search reproducing, the sounds outputted at the same level as in normal forward reproducing would be very noisy. Since the polyphase filter bank used in MPEG Audio is an overlap polyphase filter bank, processing is performed using data of one frame (1152 samples) or more during compression, while, during reproducing, decompression is performed using data of preceding frames. As a result, performing decompression or compression while skipping frames, such as during special reproducing, would produce noisy sounds because the processing is performed using data of frames that are not contiguous. Accordingly, in this embodiment, the output level of the sound signal is reduced during special reproducing, such as forward search reproducing and reverse search reproducing.

Next, a description will be made of how to reduce the output level of the sound signal.

If a special reproducing indication is detected in the input determination section 101, the switch 107 is switched to the contact 108 so as to activate the gain control section 103. The gain control section 103 calculates a new scale factor based on the scale factor unformatted in the bit stream unpacking section 101.

Figure 5:
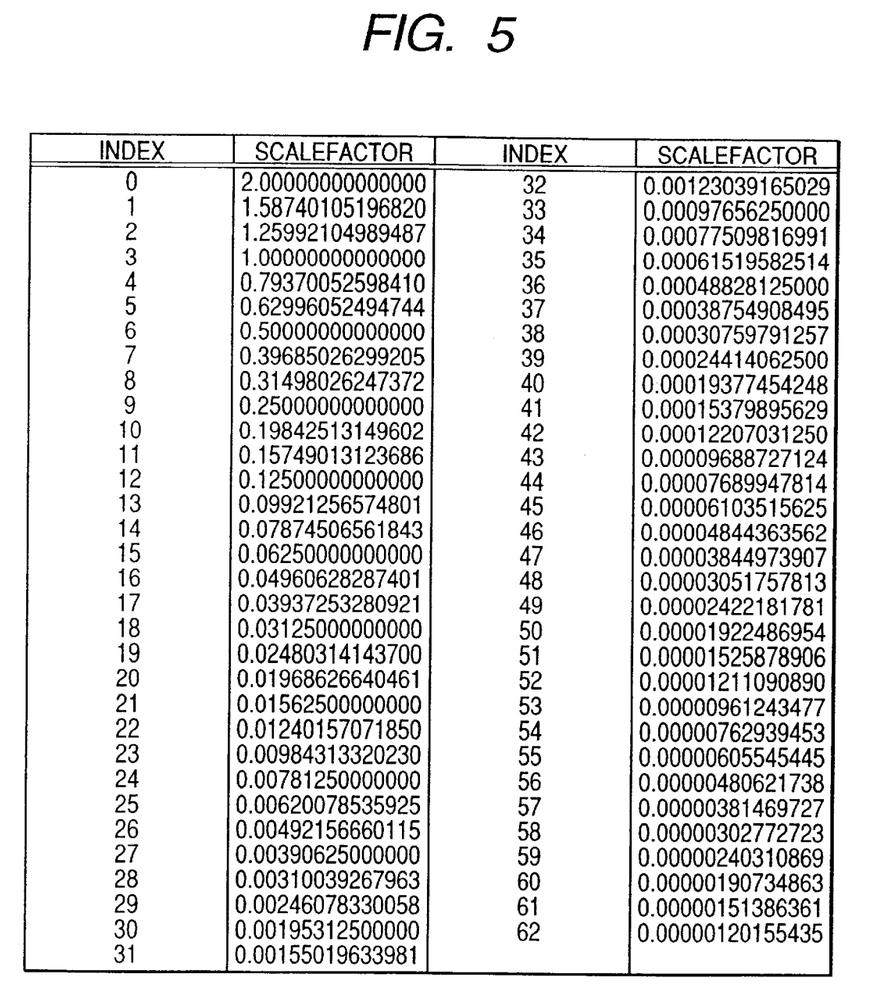
FIG. 5 is a scale factor table used in a data decompressing apparatus of the present invention.

Sample data is separated into waveform and magnification. The waveform is normalized so that its maximum amplitude is 1.0. The magnification thereof is determined by scale factors, which are shown in FIG. 5. The index field in FIG. 5 lists scale factor numbers and the scale factor field lists scale factors corresponding to scale factor numbers. As shown in FIG. 5, the scale factors are encoded with 63 table numbers about every 2 dB in the range from +6 dB to –118 dB. Calculating a new scale factor based on the encoded scale factors changes the output level of a sound signal.

As one example, a description will be made of a method of reducing the output level by about 6 dB in the case of special processing, such as forward search reproducing and reverse search reproducing. In this case, the gain control section 103 calculates a new scale factor from the following expression, based on a scale factor unformatted from a bit stream in the bit stream unpacking section 102:

New scale factor number=scale factor number+3

Namely, when a scale factor number is 0, a new scale factor number is 3. Since scale factor numbers are provided up to 62, when the original scale factor numbers are 59, 60, 61, and 62, the new scale factor number will be 62. After such processing, data having a scale factor near 62 would pose little problem in terms of reproducibility because it produces low level sounds.

The gain control section 103 searches the table for the new scale factor number to obtain a new scale factor, the requantization section 104 performs requantization using the header, bit allocation, and sample data outputted in the bit stream unpacking section 102 and the new scale factor, and the synthesis subband filter 105 synthesizes the bands of the requantized sample data. Sound decompression is achieved so that the output level is about –6 dB lower than at the time of normal reproducing. It has been experimentally confirmed that a reduction of about 6 dB reduces the sound level at special reproducing to about half of that at normal reproducing.

Next, reverse search (fast reverse search reproducing or fast reverse play) reproducing will be described using FIGS. 1, 6, and 7. Since the reverse search reproducing, is performed in the same way as the forward search reproducing except for the order of frames inputted to the bit stream unpacking section 102, a description will be made only of the order of input to the bit stream unpacking section 102.

Figure 6:
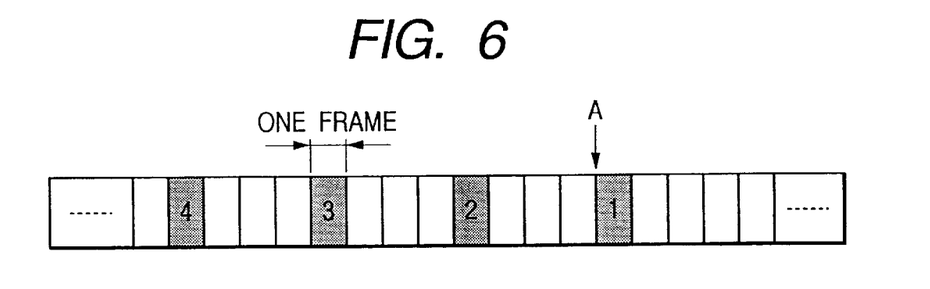
FIG. 6 is a diagram for explaining an example of quadruple-speed reverse search reproducing in a data decompressing apparatus of the present invention.
Figure 7:
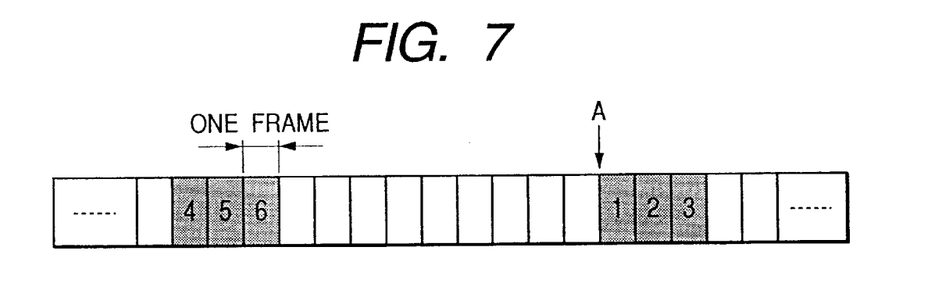
FIG. 7 is a diagram for explaining another example of quadruple-speed reverse search reproducing in a data decompressing apparatus of the present invention.

FIGS. 6 and 7 show examples of the order of frames processed in quadruple-speed reverse search reproducing. Only frames indicated by shading are processed in the order of the indicated numbers. In FIG. 6, after one frame is processed, the preceding three contiguous frames are skipped to process a preceding frame, whereby quadruple-speed reverse search reproducing is achieved. In FIG. 7, after three contiguous frames are processed, the preceding nine contiguous frames are skipped to process preceding three frames, whereby another form of quadruple-speed reverse search reproducing is achieved.

Figure 9:
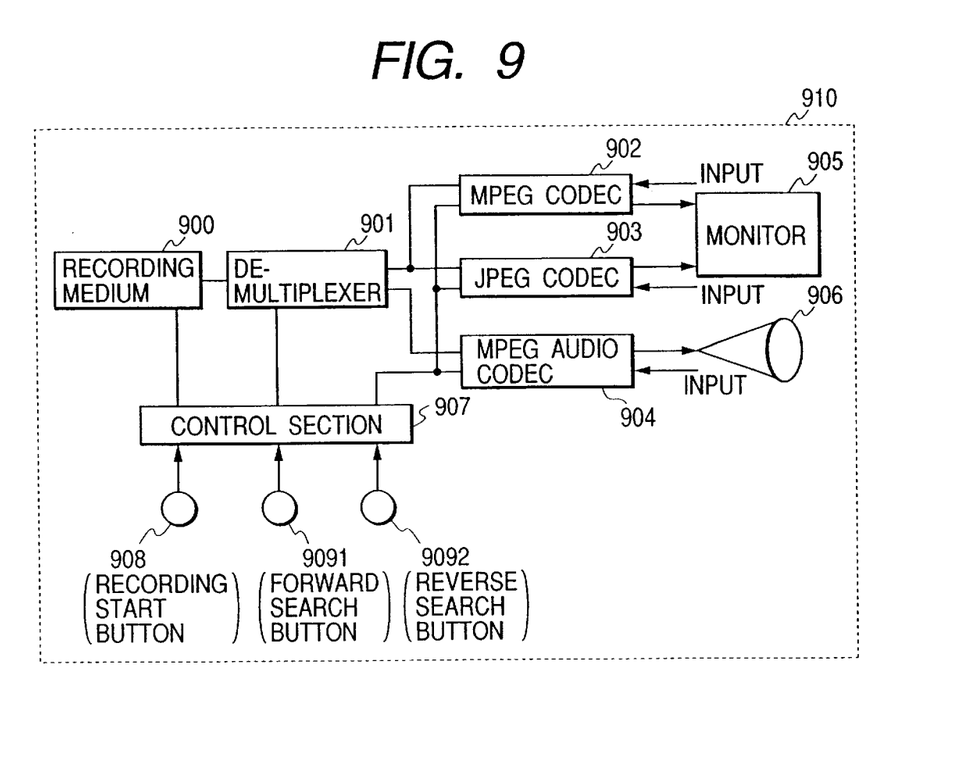
FIG. 9 is a block diagram showing the configuration of a pickup apparatus using a data decompressing apparatus of the present invention.

FIG. 9 is a block diagram showing the configuration of a pickup apparatus using a sound decompressing apparatus of the present invention. Referring to FIG. 9, a recording medium 900 contains compressed image data (video streams) and sound data (audio streams). A demultiplexer 901 separates multiplexed sounds and images. MPEG CODEC 902 compresses and decompresses the image data of moving pictures. Joint Photograph Experts Group (JPEG)

CODEC 903 compresses and decompresses the image data of still pictures. MPEG AUDIO CODEC 904 compresses and decompresses sound data. A monitor 905 displays an image decompressed in MPEG CODEC 902 or JPEG CODEC 903 on its screen. A speaker 906 outputs sound decompressed in MPEG AUDIO CODEC 904. A control section 907 controls the recording medium 900, the demultiplexer 901, the MPEG CODEC 902, the JPEG CODEC 903, and the MPEG AUDIO CODEC 904. A recording start button 908 initiates the recording operation. A forward search button 9091 initiates a forward search reproducing operation. A reverse search button 9092 initiates a reverse search reproducing operation. The pickup apparatus 910 includes the elements 901 to 9092.

Two uses, as described below, are possible in performing special reproducing of sounds using a pickup apparatus.

Figure 10:
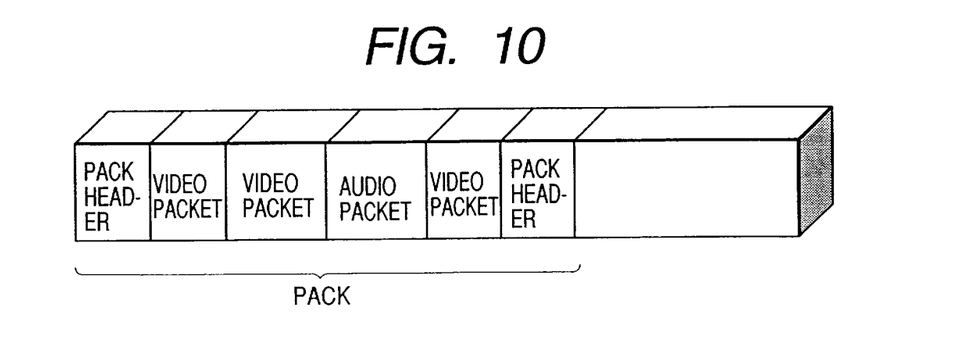
FIG. 10 is a diagram for explaining a pack with sounds and images multiplexed.

The first use is to record and reproduce moving pictures and sound. This includes a case where moving pictures and sounds are recorded by another device, and the data representing such moving pictures and sounds is inputted for reproduction. The mechanism for performing forward search or reverse search of sounds while performing forward search or reverse search of reproduced moving pictures enables users to easily perform a search operation. Moving pictures and sounds are synchronized using time-stamps provided for each access unit of the moving pictures and sound. A time-stamp is appended to the pack header of a packet shown in FIG. 10. Time stamps are classified as PTS (presentation time-stamp) and DTS (decoding time-stamp); the former gives the time management information for reproduction and the latter contains the time management information for decoding. When the STC (system time clock) within a reference decoder of an MPEG system matches the PTS, the access unit is reproduced and outputted. Use of the time-stamps provides synchronization between moving pictures being searched and sounds reproduced at fixed or predetermined intervals.

The second use is to record and reproduce still pictures and sound. During recording, still pictures are shot by the recording start button 908, while the recording of sounds is started. The recording of sounds lasts until the sound recording end button 908 is pressed. The still images and the sounds are recorded on a recording medium after being compressed by the JPEG system and the MPEG system, respectively. If the reproducing of recorded still images is called for, in the case of normal reproducing, the still images are displayed on the monitor 905 and the speaker 906 reproduces sounds. However, in the case of normal reproducing, sounds are recorded for a long time, so that it is sometimes difficult to locate portions to be accessed. Accordingly, if the forward search button 9091 or the reverse search button 9092 is manipulated, the MPEG AUDIO CODEC 904 reproduces frames at fixed or predetermined intervals, and reduces the gain during special reproducing, as described above. This is also true for the case where still images and sounds are recorded by another apparatus and the data is then inputted for reproduction.

According to the present invention, special reproducing, such as forward search reproducing and reverse search reproducing, can be carried out by decompressing frames at fixed or predetermined intervals.

By performing gain control in a series of sound decompressing processes, the output level of a sound signal can be adjusted with a simple construction without the need to provide a new gain control apparatus at a signal output stage.

While we have shown and described several embodiments in accordance with our invention, it should be understood that the disclosed embodiments are susceptible of changes and modifications without departing from the scope of the invention. Therefore, we do not intend to be bound by the details shown and described herein, but intend to cover all such changes and modifications as fall within the ambit of the appended claims.

What is claimed is:

1. A sound decompressing apparatus comprising:
   an input unit which inputs sound frames, each of the sound frames being a compressed sound data unit;
   a frame skip section which selects sound frames inputted by the input unit at fixed or predetermined intervals;
   a sound decompressing unit which decompresses the sound frames selected by the frame skip section and outputs a sound signal; and
   a gain control section which changes a gain of the sound signal outputted by the sound decompressing unit during forward search reproducing or reverse search reproducing.

2. A sound decompressing apparatus according to claim 1, wherein each of the sound frames includes a scale factor of each band of a plurality of bands; and
   wherein the gain control section calculates a new scale factor of each band for the sound frames selected by the frame skip section, the new scale factor being effective for reducing the gain of the sound signal outputted by the sound decompressing unit during forward search reproducing or reverse search reproducing, thereby being effective for reducing an output level of the sound signal outputted by the sound decompressing unit during forward search reproducing or reverse search reproducing.

3. A sound decompressing apparatus comprising:
   an input determination section which detects an indication of forward search reproducing or reverse search reproducing;
   an input unit which input s sound frames, each of the sound frames being a compressed sound data unit;
   a frame skip section which selects sound frames inputted by the input unit at fixed or predetermined intervals when the input determination section detects an indication of forward search reproducing or reverse search reproducing;
   a sound decompressing unit which decompresses the sound frames selected by the frame skip section and outputs a sound signal; and
   a gain control section which changes a gain of the sound signal outputted by the sound decompressing unit when the input determination section detects an indication of forward search reproducing or reverse search reproducing.

4. A sound decompressing apparatus according to claim 3, wherein each of the sound frames includes a scale factor of each band of a plurality of bands; and
   wherein the gain control section calculates a new scale factor of each band for the sound frames selected by the frame skip section, the new scale factor being effective for reducing the gain of the sound signal outputted by the sound decompressing unit during forward search reproducing or reverse search reproducing, thereby being effective for reducing an output level of the sound signal outputted by the sound decompressing unit during forward search reproducing or reverse search reproducing.

5. A sound decompressing apparatus comprising:
a bit stream unpacking section which inputs, for forward search reproducing or reverse search reproducing sound frames of a bit stream at fixed or predetermined intervals, each of the sound frames containing data of a fixed number of samples and being a compressed sound data unit, and which unpacks each of the sound frames into a header, a bit allocation of each band of a plurality of bands, a scale factor of each band, and quantized sample data divided into a plurality of frequency components of equal interval;
a gain control section which calculates a new scale factor of each band based on the scale factor of each band unpacked by the bit stream unpacking section;
a requantization section which requantizes the quantized sample data unpacked by the bit stream unpacking section based on the bit allocation of each band and the new scale factor of each band, and outputs requantized sample data; and
a synthesis subband filter which synthesizes bands of the requantized sample data outputted by the requantization section.

6. A sound decompressing apparatus according to claim 5, wherein the synthesis subband filter outputs a sound signal; and
wherein the gain control section calculates a new scale factor of each band which is effective for reducing an output level of the sound signal outputted by the synthesis subband filter.

7. A sound decompressing apparatus according to claim 5, further comprising an input determination section which detects an indication of forward search reproducing or reverse search reproducing;
wherein when the input determination section detects an indication of forward search reproducing or reverse search reproducing, sound frames of the bit stream are inputted to the bit stream unpacking section at fixed or predetermined intervals to perform forward search reproducing or reverse search reproducing.

8. A sound decompressing apparatus according to claim 5, wherein each of the sound frames is a smallest unit from which sound data can be decompressed.

9. An electronic camera comprising:
a Moving Picture Experts Group (MPEG) AUDIO compression/decompression circuit which compresses/decompresses sounds;
a Joint Photograph Experts Group (JPEG) compression/decompression circuit which compresses/decompresses still images;
a control circuit which controls the MPEG AUDIO compression/decompression circuit and the JPEG compression/decompression circuit; and
a search switch which gives an indication of forward search reproducing or reverse search reproducing;
wherein when the search switch gives an indication of forward search reproducing or reverse search reproducing, the control circuit controls the MPEG AUDIO compression/decompression circuit to select compressed sound data at fixed or predetermined intervals, skip other compressed sound data, and decompress and reproduce the selected compressed sound data, and controls the JPEG compression/decompression circuit to decompress and reproduce a still image.

10. An electronic camera according to claim 9, wherein the MPEG AUDIO compression/decompression circuit includes:
an input unit which inputs sound frames, each of the sound frames being a compressed sound data unit;
a frame skip section which selects sound frames inputted by the input unit at fixed or predetermined intervals when the search switch gives an indication of forward search reproducing or reverse search reproducing; and
a sound decompressing unit which decompresses the sound frames selected by the frame skip section.

11. An electronic camera according to claim 1, wherein each of the sound frames is a smallest unit from which sound data can be decompressed.

12. An electronic camera according to claim 9, wherein the MPE AUDIO compression/decompression circuit includes:
an input unit which inputs a bit stream consisting of sound frames, each of the sound frames containing data of a fixed number of samples and being a compressed sound data unit;
a frame skip section which selects sound frames of the bit stream inputted by the input unit at fixed or predetermined intervals when the search switch gives an indication of forward search reproducing or reverse search reproducing;
a bit stream unpacking section which unpacks a sound frame selected by the frame skip section into a header, a bit allocation of each band of a plurality of bands, a scale factor of each band, and quantized sample data divided into a plurality of frequency components of equal interval;
a requantization section which requantizes the quantized sample data unpacked by the bit stream unpacking section based on the bit allocation of each band and the scale factor of each band, and outputs requantized data; and
a synthesis subband filter which synthesizes bands of the requantized sample data outputted by the requantization section.

13. An electronic camera according to claim 12, wherein a speed of forward search reproducing or reverse search reproducing is changed by changing the fixed or predetermined intervals at which the frame skip section selects sound frames of the bit stream inputted by the input unit.

14. An electronic camera according to claim 12, wherein a number of sound frames selected by the frame skip section and a number of sound frames not selected by the frame skip section are changeable.

15. An electronic camera according to claim 12, wherein each of the sound frames is a smallest unit from which sound data can be decompressed.

16. An electronic camera according to claim 9, wherein the MPEG AUDIO compression/decompression circuit outputs a sound signal; and
wherein the electronic camera further includes a gain control section which changes a gain of the sound signal outputted by the MPEG AUDIO compression/decompression circuit during forward search reproducing or reverse search reproducing.

17. An electronic camera according to claim 16, wherein the MPEG AUDIO compression/decompression circuit includes
an input unit which inputs sound frames, each of the sound frames being a compressed sound data unit and including a scale factor of each band of a plurality of bands, a frame skip section which selects sound frames inputted by the input unit at fixed or predetermined intervals when the search switch gives an indication of forward search reproducing or reverse search reproducing, and a sound decompressing unit which decompresses the sound frames selected by the frame skip section and outputs the sound signal; and wherein the gain control section calculates a new scale factor of each band for the sound frames selected by the frame skip section, the new scale factor being effective for reducing the gain of the sound signal outputted by the sound decompressing unit during forward search reproducing or reverse search reproducing, thereby being effective for reducing an output level of the sound signal outputted by the sound decompressing unit during forward search reproducing or reverse search reproducing.

18. An electronic camera according to claim 9, wherein each of the compressed sound data which is selected or skipped is a smallest unit from which sound data can be decompressed.

* * * * *